(12) United States Patent
Hoshino (10) Patent No.: US 11,563,870 B1
(45) Date of Patent: Jan. 24, 2023

(54) INFORMATION PROCESSING APPARATUS, NON-TRANSITORY COMPUTER READABLE MEDIUM, AND INFORMATION PROCESSING METHOD TO TRANSMIT AND RECEIVE A FACSIMILE INCLUDING REGISTERING CORRESPONDENCE INFORMATION

(71) Applicant: FUJIFILM Business Innovation Corp., Tokyo (JP)

(72) Inventor: Haruhisa Hoshino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/550,701

(22) Filed: Dec. 14, 2021

(30) Foreign Application Priority Data

Aug. 16, 2021 (JP) .............................. JP2021-132324

(51) Int. Cl.
*H04N 1/00* (2006.01)
*H04N 1/32* (2006.01)
(52) U.S. Cl.
CPC ....... *H04N 1/3209* (2013.01); *H04N 1/00209* (2013.01); *H04N 1/00347* (2013.01); *H04N 2201/0094* (2013.01)
(58) Field of Classification Search
None
See application file for complete search history.

(56) References Cited

U.S. PATENT DOCUMENTS

| 5,552,901 | A | 9/1996 | Kikuchi et al. | |
|---|---|---|---|---|
| 2011/0317223 | A1* | 12/2011 | Nagao | H04N 1/00204 358/442 |
| 2012/0250099 | A1* | 10/2012 | Kanemoto | H04N 1/32128 358/435 |
| 2013/0088741 | A1* | 4/2013 | Murata | H04N 1/00421 358/1.14 |
| 2021/0168262 | A1* | 6/2021 | Sato | H04N 1/00692 |

FOREIGN PATENT DOCUMENTS

JP 3599718 B2 12/2004

* cited by examiner

*Primary Examiner* — Henok Shiferaw
(74) *Attorney, Agent, or Firm* — Sughrue Mion, PLLC (57) ABSTRACT

An information processing apparatus includes: a processor configured to transfer data of a received facsimile by referring to correspondence information in which a correspondence between a telephone number and identification information is registered, the identification information identifying a partner of communication by facsimile from or to the telephone number; and in a case where a facsimile transmission request has been received from a requester and a correspondence between identification information identifying the requester and a telephone number of a destination included in the facsimile transmission request is not registered in the correspondence information, additionally register the correspondence between the identification information and the telephone number in the correspondence information.

12 Claims, 9 Drawing Sheets

| FAX NUMBER OF EXTERNAL FAX MACHINE | INFORMATION SPECIFYING SLAVE APPARATUS (EXAMPLE: INTERNET FAX MAIL ADDRESS) | DATE AND TIME OF LATEST TRANSMISSION | NUMBER OF TRANSMISSIONS |
|---|---|---|---|
| 0123456789 | MFP-Slave-01@xxx.co.jp | 03/01/2021 10:00:00 | 5 |
| 0333333333 | MFP-Slave-03@xxx.co.jp | 03/01/2021 15:00:00 | 10 |
| 0987654321 | MFP-Slave-01@xxx.co.jp | 03/10/2021 13:00:00 | 15 |
| 0987654321 | MFP-Slave-02@xxx.co.jp | 03/01/2021 16:00:00 | 5 |

| FAX NUMBER OF EXTERNAL FAX MACHINE | INFORMATION SPECIFYING SLAVE APPARATUS (EXAMPLE: INTERNET FAX MAIL ADDRESS) | DATE AND TIME OF LATEST TRANSMISSION | NUMBER OF TRANSMISSIONS |
|---|---|---|---|
| 0123456789 | MFP-Slave-01@xxx.co.jp | 03/01/2021 10:00:00 | 5 |
| 0333333333 | MFP-Slave-03@xxx.co.jp | 03/01/2021 15:00:00 | 10 |
| 0987654321 | MFP-Slave-01@xxx.co.jp | 03/10/2021 13:00:00 | 15 |
| 0987654321 | MFP-Slave-02@xxx.co.jp | 03/01/2021 16:00:00 | 5 |
| 0999999999 | MFP-Slave-17@xxx.co.jp | 03/26/2021 17:18:00 | 1 |

FIG. 9

FIG. 10

US 11,563,870 B1

INFORMATION PROCESSING APPARATUS, NON-TRANSITORY COMPUTER READABLE MEDIUM, AND INFORMATION PROCESSING METHOD TO TRANSMIT AND RECEIVE A FACSIMILE INCLUDING REGISTERING CORRESPONDENCE INFORMATION

CROSS-REFERENCE TO RELATED APPLICATIONS

This application is based on and claims priority under 35 USC 119 from Japanese Patent Application No. 2021-132324 filed Aug. 16, 2021.

BACKGROUND

(i) Technical Field

The present disclosure relates to an information processing apparatus, a non-transitory computer readable medium, and an information processing method.

(ii) Related Art

Japanese Patent No. 3599718 discloses a facsimile apparatus including a data transmission unit that transmits, to another facsimile apparatus via a public line, document data transferred from an information processing apparatus via a local area network (LAN), and a printer unit that prints the document data transferred from the information processing apparatus via the LAN.

SUMMARY

To make it possible to receive a document from an outside by using a facsimile function, a contract for using a telephone line is necessary. If plural apparatuses are installed for using a facsimile function in the apparatuses, user convenience increases, but making a contract for using a telephone line is necessary, which increases an initial cost and a fixed cost. On the other hand, if only a specific apparatus is capable of receiving a document from an outside by using a facsimile function and outputting the document, a user needs to move to the apparatus and receive the document transmitted by facsimile and output by the apparatus, which decreases convenience.

Aspects of non-limiting embodiments of the present disclosure relate to an information processing apparatus, a non-transitory computer readable medium, and an information processing method that are capable of increasing user convenience without increasing the number of apparatuses that transmit and receive a facsimile, compared to a case where only a specific apparatus receives and outputs a facsimile.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: transfer data of a received facsimile by referring to correspondence information in which a correspondence between a telephone number and identification information is registered, the identification information identifying a partner of communication by facsimile from or to the telephone number; and in a case where a facsimile transmission request has been received from a requester and a correspondence between identification information identifying the requester and a telephone number of a destination included in the facsimile transmission request is not registered in the correspondence information, additionally register the correspondence between the identification information and the telephone number in the correspondence information.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described with reference to the drawings. In the drawings, elements and parts that are the same as or equivalent to each other are denoted by the same reference numerals. The dimensional ratios in the drawings are exaggerated for convenience of description and may be different from actual ratios.

Figure 1:
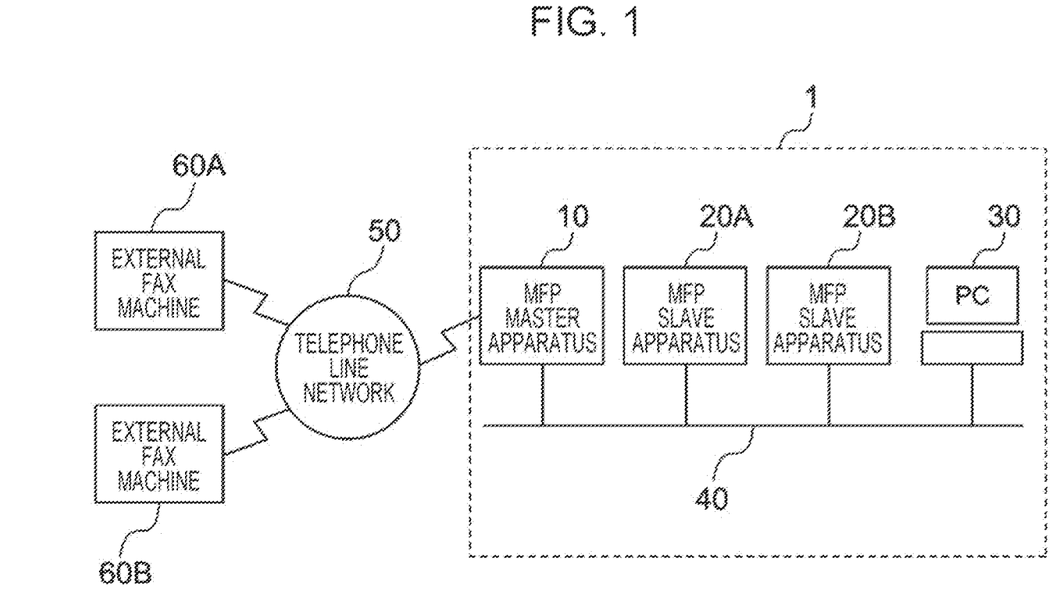
FIG. 1 is a diagram illustrating a schematic configuration of an information processing system according to the exemplary embodiment.

FIG. 1 is a diagram illustrating a schematic configuration of an information processing system 1 according to the exemplary embodiment. The information processing system 1 according to the exemplary embodiment includes a multifunction peripheral (MFP) master apparatus 10, MFP slave apparatuses 20A and 20B, and a personal computer (PC) 30. The MFP master apparatus 10, the MFP slave apparatuses 20A and 20B, and the PC 30 are connected to each other via an Internet protocol (IP) network 40. The IP network 40 includes at least either of a local area network (LAN) and a wide area network (WAN). The IP network 40 may be a wired network or may be a wireless network.

The MFP master apparatus 10 is an MFP having plural functions such as a scan function, a print function, a copy function, an email function, and a facsimile function, and is an example of an information processing apparatus according to an exemplary embodiment of the present disclosure. The MFP slave apparatuses 20A and 20B are MFPs having functions similar to those of the MFP master apparatus 10, but do not have at least a facsimile function and have an email function. In the following description, the MFP slave apparatuses 20A and 20B may be collectively referred to as MFP slave apparatuses 20. The PC 30 is an apparatus having at least an email function.

The MFP master apparatus 10 has a facsimile function of transmitting a facsimile to and receiving a facsimile from an external FAX machine via a telephone line network 50. Although FIG. 1 illustrates external FAX machines 60A and 60B connected to the telephone line network 50, there may be three or more external FAX machines. In the following description, the external FAX machines 60A and 60B may be collectively referred to as external FAX machines 60.

The MFP slave apparatuses 20A and 20B are capable of transmitting a facsimile to an external FAX machine by requesting the MFP master apparatus 10 to transmit a facsimile. The MFP slave apparatuses 20A and 20B are capable of receiving a facsimile from an external FAX machine by receiving transfer of data of the facsimile from the MFP master apparatus 10. The MFP slave apparatuses 20A and 20B may have a facsimile function. In that case, the MFP slave apparatuses 20A and 20B need not necessarily be connected to the telephone line network 50.

The PC 30 is capable of transmitting a facsimile to an external FAX machine by requesting the MFP master apparatus 10 to transmit a facsimile, like the MFP slave apparatuses 20A and 20B. The PC 30 is capable of receiving a facsimile from an external FAX machine by receiving transfer of data of the facsimile from the MFP master apparatus 10, like the MFP slave apparatuses 20A and 20B.

In the following description, the MFP slave apparatuses 20A and 20B and the PC 30 may be collectively referred to as "slave apparatuses".

A company often has plural MFPs installed in accordance with the number of persons. In such a company, if all the MFPs have a facsimile function and are allocated with a telephone line so that every user is able to use the facsimile function in an MFP near his/her desk, an initial cost for installing the telephone line and a fixed cost for using the telephone line are necessary. On the other hand, if only a specific MFP has a facsimile function, the distance to the MFP in which the facsimile function is available may be long to some users, and thus user convenience decreases compared to a case where all the MFPs have a facsimile function. In addition, a user who is teleworking or working from home may need to transmit or receive a facsimile for communicating with another company. However, there is not an apparatus capable of transmitting and receiving a facsimile in the user's home or a satellite office in many cases, which causes time and effort of going to an office to transmit or receive a facsimile or going to a convenience store or the like to transmit a facsimile.

Accordingly, to reduce an initial cost and a fixed cost and to increase user convenience, a telephone line is allocated to only the MFP master apparatus 10 as illustrated in FIG. 1, other apparatuses (the MFP slave apparatus 20A and 20B and the PC 30) transmit a scan image to be transmitted by facsimile to the MFP master apparatus 10 having a facsimile function via the IP network 40, and the MFP master apparatus 10 serves as a relay apparatus and a proxy transmitter of a facsimile.

In the exemplary embodiment, the MFP master apparatus 10 has a correspondence list therein so as to enable the MFP slave apparatuses 20A and 20B and the PC 30, which are incapable of transmitting and receiving a facsimile via the telephone line network 50, to transmit a facsimile to and receive a facsimile from an external FAX machine. The correspondence list is a list describing correspondence information about correspondences between external FAX machines, and the MFP slave apparatuses 20A and 20B and the PC 30. The MFP master apparatus 10 refers to the correspondence list and transfers a facsimile from an external FAX machine to the MFP slave apparatus 20A or 20B or the PC 30.

In response to receipt of a facsimile transmission request from the MFP slave apparatus 20A or 20B or the PC 30, the MFP master apparatus 10 determines whether the correspondence between the MFP slave apparatus 20A or 20B or the PC 30 and the external FAX machine as a destination is described in the correspondence list. If the correspondence is not described in the correspondence list, the MFP master apparatus 10 describes the correspondence in the correspondence list and then transmits a facsimile to the destination external FAX machine.

The MFP master apparatus 10 refers to the correspondence information and transfers data of a facsimile in response to receipt of the facsimile, and registers a correspondence as appropriate at the time of transmitting a facsimile in response to a request. Accordingly, convenience of users who use the MFP slave apparatuses 20A and 20B and the PC 30 may be increased at the time of receiving a facsimile, compared to a case where only a specific apparatus receives and outputs a facsimile.

Figure 2:
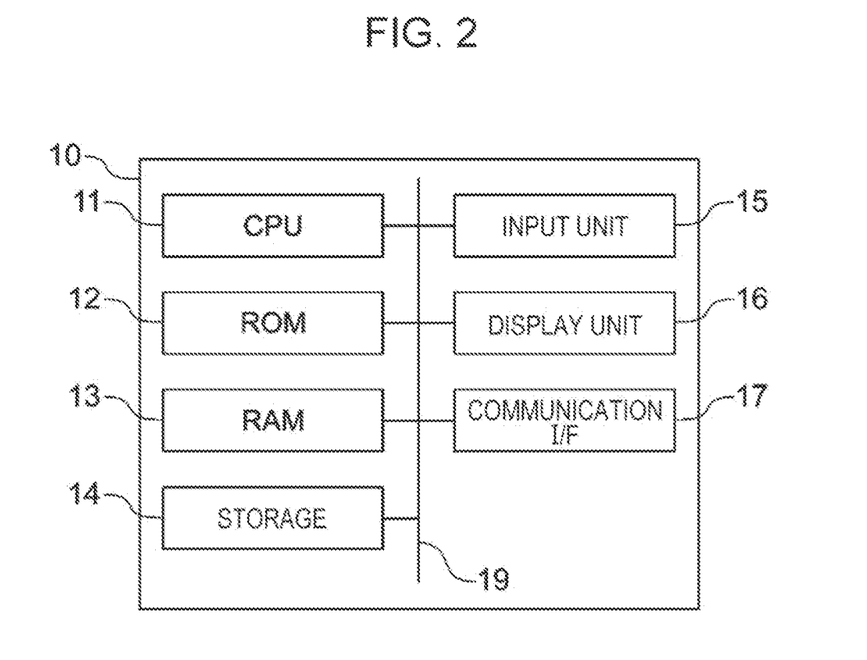
FIG. 2 is a block diagram illustrating a hardware configuration of an MFP master apparatus.

FIG. 2 is a block diagram illustrating a hardware configuration of the MFP master apparatus 10.

As illustrated in FIG. 2, the MFP master apparatus 10 includes a central processing unit (CPU) 11, a read only memory (ROM) 12, a random access memory (RAM) 13, a storage 14, an input unit 15, a display unit 16, and a communication interface (I/F) 17. These elements are connected to each other via a bus 19 so as to be capable of communicating with each other.

The CPU 11 executes various programs and controls the individual units. Specifically, the CPU 11 reads out a program from the ROM 12 or the storage 14 and executes the program by using the RAM 13 as a work area. The CPU 11 controls the above-described elements and performs various arithmetic processing operations in accordance with programs recorded on the ROM 12 or the storage 14. In the exemplary embodiment, an information processing program related to facsimile transmission to and facsimile reception from an external FAX machine is stored in the ROM 12 or the storage 14.

The ROM 12 stores various programs and various data. The RAM 13 serves as a work area and temporarily stores a program or data. The storage 14 is constituted by a storage device such as a hard disk drive (HDD), a solid state drive (SSD), or a flash memory, and stores various programs including an operating system and various data.

The input unit 15 includes a pointing device, such as a mouse, and a keyboard, and is used to perform various input operations.

The display unit 16 is, for example, a liquid crystal display, and displays various pieces of information. The display unit 16 may have a touch screen and function as the input unit 15.

The communication interface 17 is an interface for communicating with other apparatuses, such as the MFP slave apparatuses 20A and 20B and the PC 30, and uses the standard of Ethernet (registered trademark), FDDI, Wi-Fi (registered trademark), or the like, for example.

When executing the above-mentioned information processing program, the MFP master apparatus 10 implements various functions by using the above-described hardware resources. The functional elements implemented by the MFP master apparatus 10 will be described.

Figure 3:
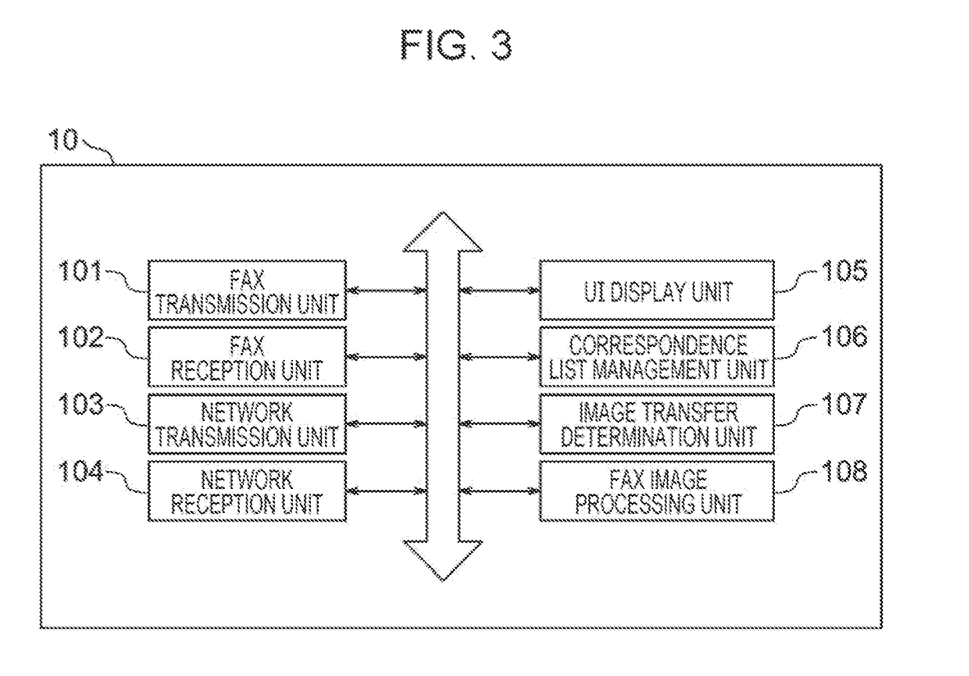
FIG. 3 is a block diagram illustrating an example of a functional configuration of the MFP master apparatus.

FIG. 3 is a block diagram illustrating an example of functional elements of the MFP master apparatus 10.

As illustrated in FIG. 3, the MFP master apparatus 10 includes, as functional elements, a FAX transmission unit 101, a FAX reception unit 102, a network transmission unit 103, a network reception unit 104, a user interface (UI) display unit 105, a correspondence list management unit 106, an image transfer determination unit 107, and a FAX image processing unit 108. The individual functional elements are implemented as a result of the information processing program, which is stored in the ROM 12 or the storage 14, being read and executed by the CPU 11.

The FAX transmission unit 101 performs facsimile transmission to an external FAX machine via the telephone line network 50. The FAX transmission unit 101 performs not only facsimile transmission from the MFP master apparatus 10 but also facsimile transmission based on a facsimile transmission request from the MFP slave apparatus 20A or 20B or the PC 30. The FAX transmission unit 101 refers to the correspondence list managed by the correspondence list management unit 106 when performing facsimile transmission based on a facsimile transmission request from the MFP slave apparatus 20A or 20B or the PC 30.

The FAX reception unit 102 receives a facsimile transmitted by an external FAX machine via the telephone line network 50.

The network transmission unit 103 transmits data to the MFP slave apparatus 20A or 20B or the PC 30 connected to the IP network 40. For example, if the destination of a facsimile received by the FAX reception unit 102 is at least any one of the MFP slave apparatus 20A, the MFP slave apparatus 20B, or the PC 30, the network transmission unit 103 transmits image data of the received facsimile to the MFP slave apparatus 20A or 20B or the PC 30 as the destination by email or the like. The destination is determined by the image transfer determination unit 107.

The function or protocol of transferring the image data of a facsimile is not limited to a specific function or protocol. For example, the network transmission unit 103 may transmit the image data of a facsimile to the Internet FAX mail address of the MFP slave apparatus 20A or 20B or the PC 30 by using an Internet FAX function and a simple mail transfer protocol (SMTP).

The network reception unit 104 receives data from the MFP slave apparatus 20A or 20B or the PC 30 connected to the IP network 40. For example, if the data received by the network reception unit 104 is data including a facsimile transmission request from the MFP slave apparatus 20A or 20B or the PC 30, the network reception unit 104 instructs the FAX transmission unit 101 to transmit a facsimile based on the transmission request.

The UI display unit 105 displays a user interface on the display unit 16. The user interface displayed by the UI display unit 105 is a user interface for operating the MFP master apparatus 10 and is a user interface for causing a user to execute the scan function, the print function, the copy function, the email function, or the facsimile function of the MFP master apparatus 10.

The correspondence list management unit 106 manages a correspondence list describing correspondences between the MFP slave apparatuses 20A and 20B and the PC 30 connected to the IP network 40, and the external FAX machines 60A and 60B. The details of the correspondence list will be described below.

The image transfer determination unit 107 determines, by referring to the correspondence list, whether to transfer image data of a facsimile received by the FAX reception unit 102 to the MFP slave apparatus 20A or 20B or the PC 30 connected to the IP network 40.

The FAX image processing unit 108 converts data of a facsimile received by the FAX reception unit 102 into image data of a predetermined format, such as a Joint Photographic Experts Group (JPEG) format or a Tagged Image File Format (TIFF) format. The image data generated by the FAX image processing unit 108 may be transmitted to the MFP slave apparatus 20A or 20B or the PC 30 by being attached to an email transmitted by the network transmission unit 103.

Next, the operation of the MFP master apparatus 10 will be described.

Figure 4:
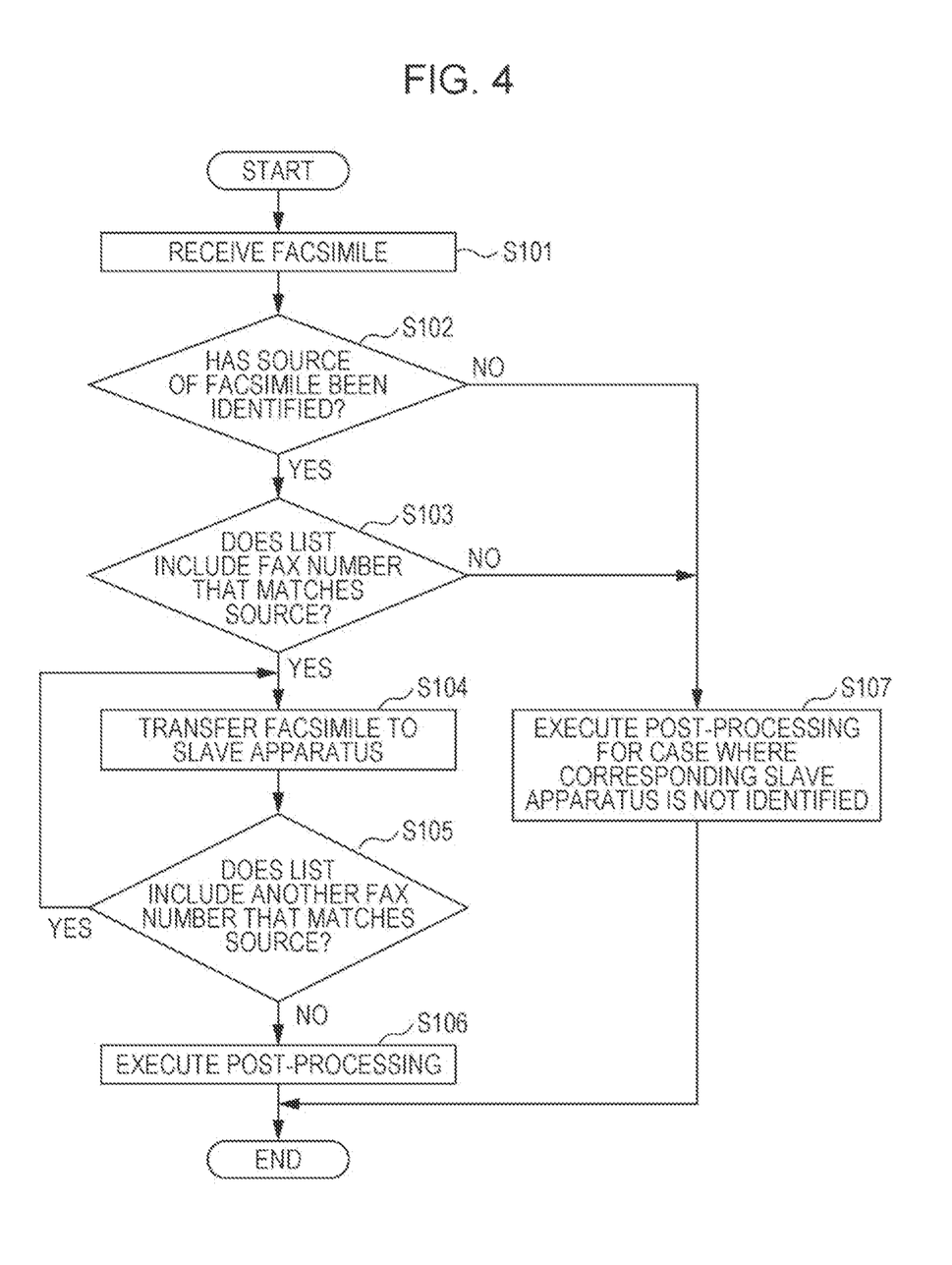
FIG. 4 is a flowchart illustrating a procedure of information processing performed by the MFP master apparatus at the time of receiving a facsimile.

FIG. 4 is a flowchart illustrating a procedure of image processing performed by the MFP master apparatus 10 at the time of receiving a facsimile. The CPU 11 reads out the information processing program from the ROM 12 or the storage 14, loads the program to the RAM 13, and executes the program, and accordingly information processing at the time of receiving a facsimile is performed.

First, in step S101, the CPU 11 receives a facsimile via the telephone line network 50. Subsequently, in step S102, the CPU 11 determines whether a source of the facsimile has been identified. The source of the facsimile is a telephone number of the external FAX machine 60A or 60B, or G3ID.

If it is determined in step S102 that the source of the facsimile has been identified (YES in step S102), the CPU 11 determines in step S103 whether the correspondence list managed by the MFP master apparatus 10 includes a FAX number of an external FAX machine that matches the source of the facsimile.

Figure 5:
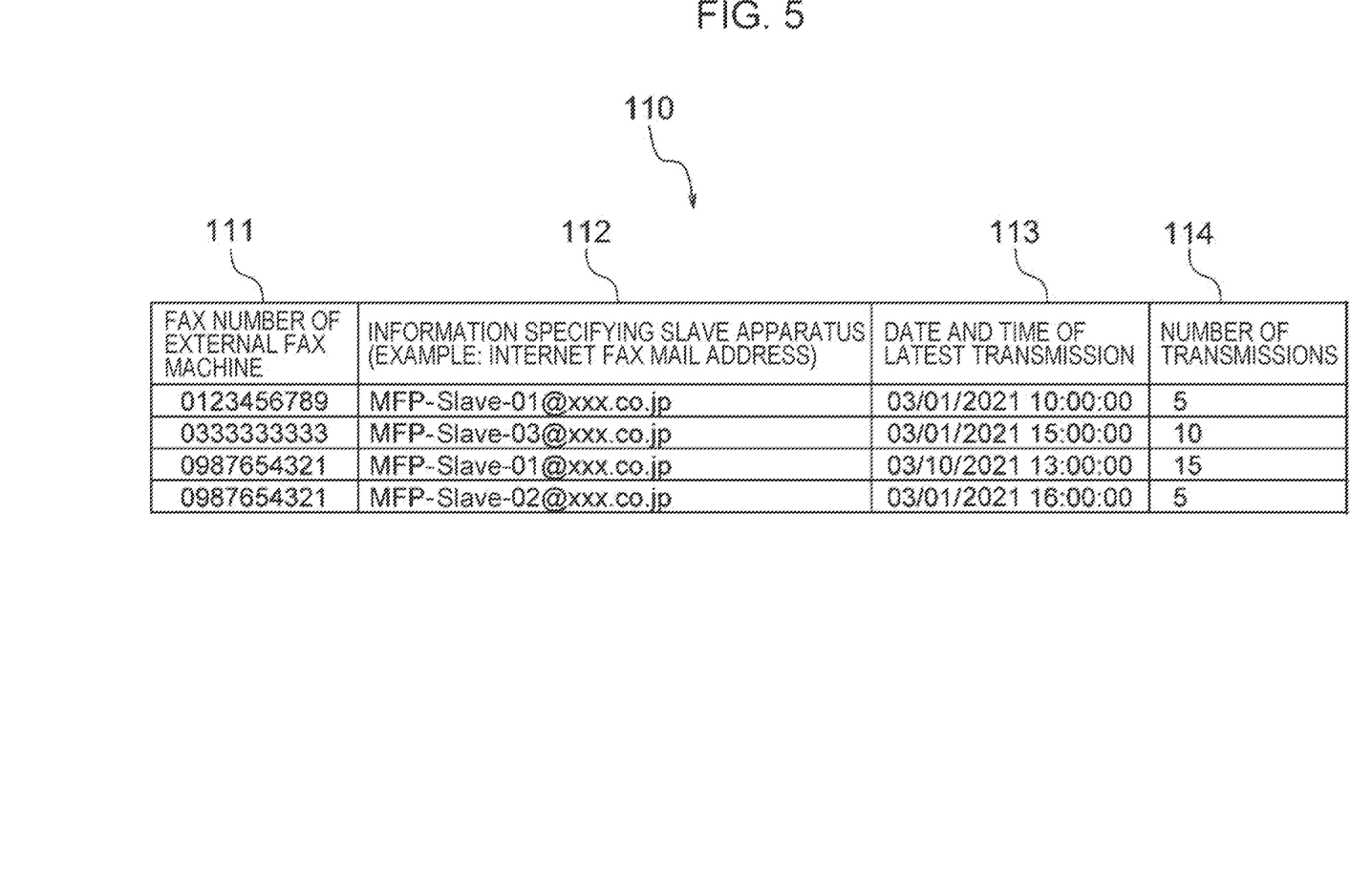
FIG. 5 is a diagram illustrating an example of a correspondence list managed by the MFP master apparatus.

FIG. 5 is a diagram illustrating an example of the correspondence list managed by the MFP master apparatus 10. A correspondence list 110 is made up of a column 111 of a FAX number of an external FAX machine, a column 112 of information specifying a slave apparatus, a column 113 of a date and time of latest transmission, and a column 114 of the number of transmissions. The column 111 stores a FAX number of an external FAX machine. The column 112 stores, as identification information identifying a slave apparatus, information specifying the slave apparatus, for example, an Internet FAX mail address. The column 113 stores the date and time when the slave apparatus in the same row last transmitted a facsimile to the corresponding FAX number. The column 114 stores the number of times the slave apparatus in the same row transmitted a facsimile to the corresponding FAX number. The CPU 11 refers to the column 111 of the correspondence list 110 and determines whether there is a FAX number that matches the source of the facsimile in the column 111.

If it is determined in step S103 that the correspondence list managed by the MFP master apparatus 10 includes a FAX number of an external FAX machine that matches the source of the facsimile (YES in step S103), the CPU 11 transfers the received facsimile to the slave apparatus associated with the matched FAX number in step S104. The CPU 11 converts the received facsimile into image data and transmits the image data to the email address specifying the associated slave apparatus by attaching the image data to an email, thereby transferring the facsimile.

For example, in a case where a facsimile has been received from a FAX number "0123456789", the CPU 11 is capable of grasping that there is "0123456789" in the column 111 by referring to the correspondence list 110. Then, the CPU 11 acquires an email address "MFP-Slave-01@xxx.co.jp" by referring to the column 112 in the row of "0123456789" and transmits the image data of the received facsimile to the acquired email address by attaching the image data to an email.

In a case where a facsimile has been received from a FAX number "0987654321", there are two corresponding slave apparatuses in the example of the correspondence list 110 illustrated in FIG. 5. In this case, the CPU 11 may transfer the facsimile to all the two slave apparatuses or to only a highest-priority slave apparatus. In the case of transferring the facsimile to a highest-priority slave apparatus, the CPU 11 may regard, as the highest-priority slave apparatus, the slave apparatus having the largest number of transmissions to the telephone number of the source of the facsimile. Alternatively, the CPU 11 may regard, as the highest-priority slave apparatus, the slave apparatus having the latest date and time of latest transmission to the telephone number of the source of the facsimile.

After step S104, the CPU 11 determines in step S105 whether the correspondence list includes another FAX number that matches the source of the received facsimile.

As a result of the determination in step S105, if the correspondence list includes another FAX number that matches the source of the received facsimile (YES in step S105), the CPU 11 returns to step S104 and transfers the received facsimile to the slave apparatus associated with the matched FAX number. On the other hand, as a result of the determination in step S105, if the correspondence list does not include another FAX number that matches the source of the received facsimile (NO in step S105), the CPU 11 executes post-processing for facsimile reception in step S106. The post-processing for facsimile reception includes, for example, deletion of the image data of the facsimile.

On the other hand, if it is determined in step S102 that the source of the facsimile has not been identified (NO in step S102), the CPU 11 executes, in step S107, post-processing for facsimile reception for a case where a corresponding slave apparatus is not identified. The post-processing for facsimile reception for a case where a corresponding slave apparatus is not identified includes, for example, processing of outputting the facsimile received by the MFP master apparatus 10, processing of transferring the facsimile to a specific slave apparatus, processing of transferring the facsimile to all the slave apparatuses, and the like. As a result of the post-processing for facsimile reception for a case where a corresponding slave apparatus is not identified, the CPU 11 is capable of, even when receiving a facsimile from an external FAX machine that is not registered in the correspondence list, printing and outputting the facsimile by using an appropriate MFP so that facsimile reception is confirmed.

Figure 6:
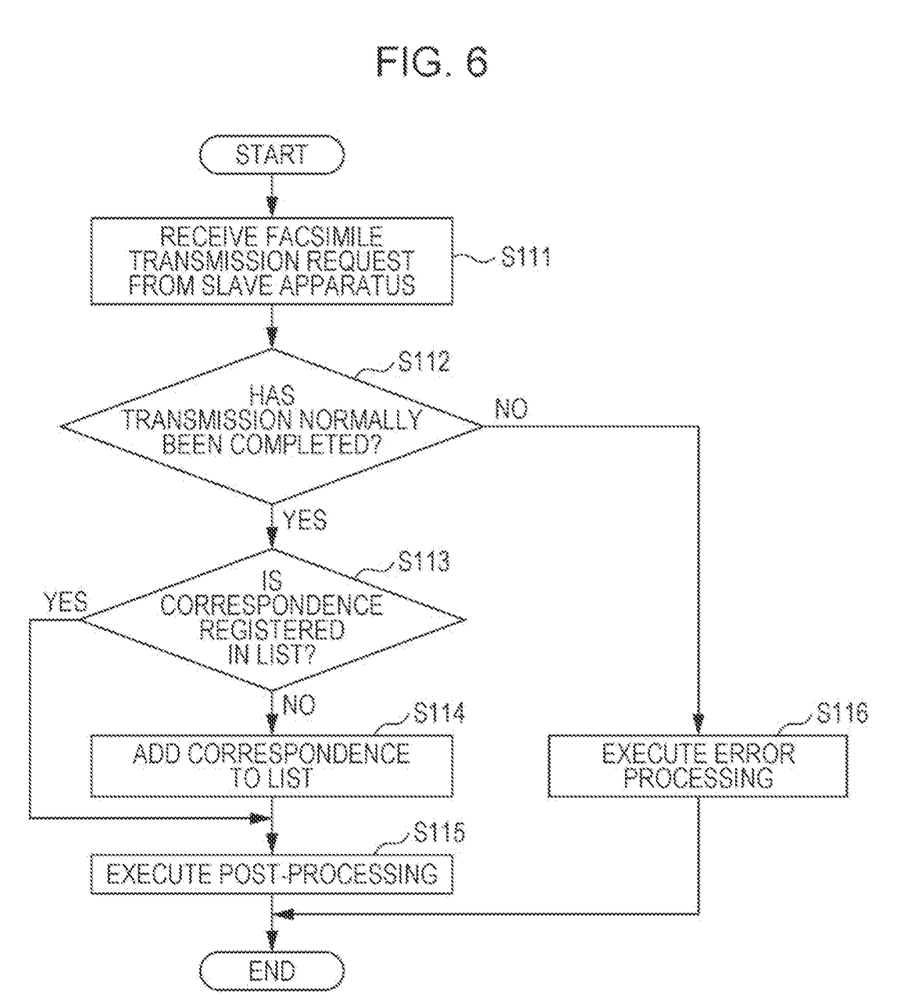
FIG. 6 is a flowchart illustrating a procedure of information processing performed by the MFP master apparatus at the time of receiving a facsimile transmission request from a slave apparatus.

FIG. 6 is a flowchart illustrating a procedure of information processing performed by the MFP master apparatus 10 at the time of receiving a facsimile transmission request from a slave apparatus. The CPU 11 reads out the information processing program from the ROM 12 or the storage 14, loads the program to the RAM 13, and executes the program, and accordingly information processing at the time of receiving a facsimile transmission request from a slave apparatus is performed.

First, in step S111, the CPU 11 receives a facsimile transmission request from a slave apparatus via the IP network 40. The facsimile transmission request from a slave apparatus is made by, for example, email.

Figure 7:
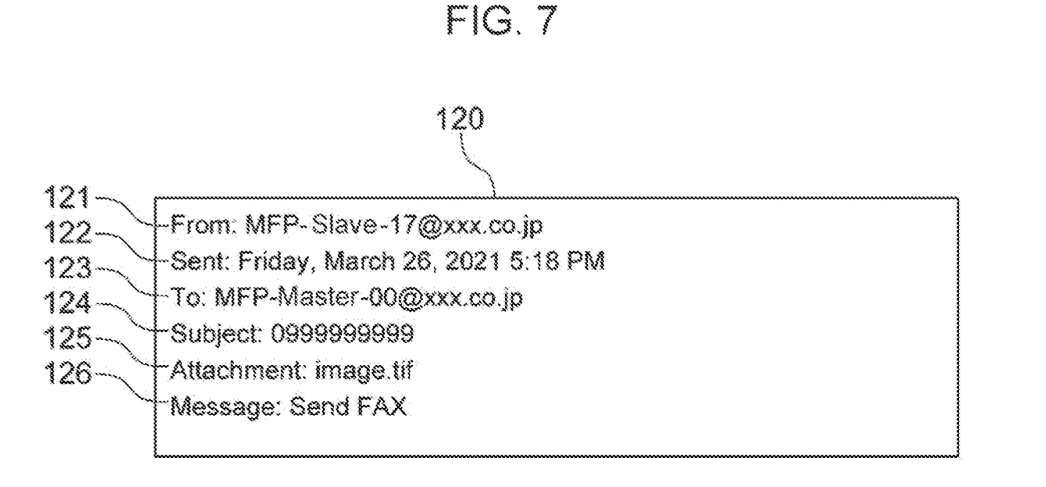
FIG. 7 is a diagram illustrating an example of an email transmitted from a slave apparatus to the MFP master apparatus.

FIG. 7 is a diagram illustrating an example of an email transmitted from a slave apparatus to the MFP master apparatus 10. An email 120 illustrated in FIG. 7 is made up of a source address 121, a date and time of transmission 122, a destination address 123, a subject 124, an attached file 125, and a text message 126. In the subject 124, a FAX number of an external FAX machine is described. The attached file 125 is image data that is to be transmitted as a facsimile from the MFP master apparatus 10 to the external FAX machine. In the text message 126, text for requesting facsimile transmission to the external FAX machine is described.

In the example illustrated in FIG. 7, the MFP master apparatus 10 is requested from a slave apparatus having an email address "MFP-Slave-17@xxx.co.jp" to transmit an image file "image.tif" to an external FAX machine having a FAX number "0999999999" by facsimile. The attached file 125 attached to the email 120 may be, if the slave apparatus is the MFP slave apparatus 20 and if the MFP slave apparatus 20 has a scan function, an image file generated by processing of scanning paper by the MFP slave apparatus 20. The attached file 125 attached to the email 120 may be, if the slave apparatus is the PC 30, an image file created based on a document file created by the PC 30.

Subsequently, in step S112, the CPU 11 determines whether facsimile transmission has normally been completed based on the facsimile transmission request from the slave apparatus.

As a result of the determination in step S112, if facsimile transmission has normally been completed (YES in step S112), the CPU 11 determines in step S113 whether the correspondence between information specifying the slave apparatus as the source and the FAX number of the destination is registered in the correspondence list.

As a result of the determination in step S113, if the correspondence between information specifying the slave apparatus as the source and the FAX number of the destination is not registered in the correspondence list (NO in step S113), the CPU 11 newly adds, in step S114, the correspondence between information specifying the slave apparatus as the source and the FAX number of the destination to the correspondence list.

Figure 8:
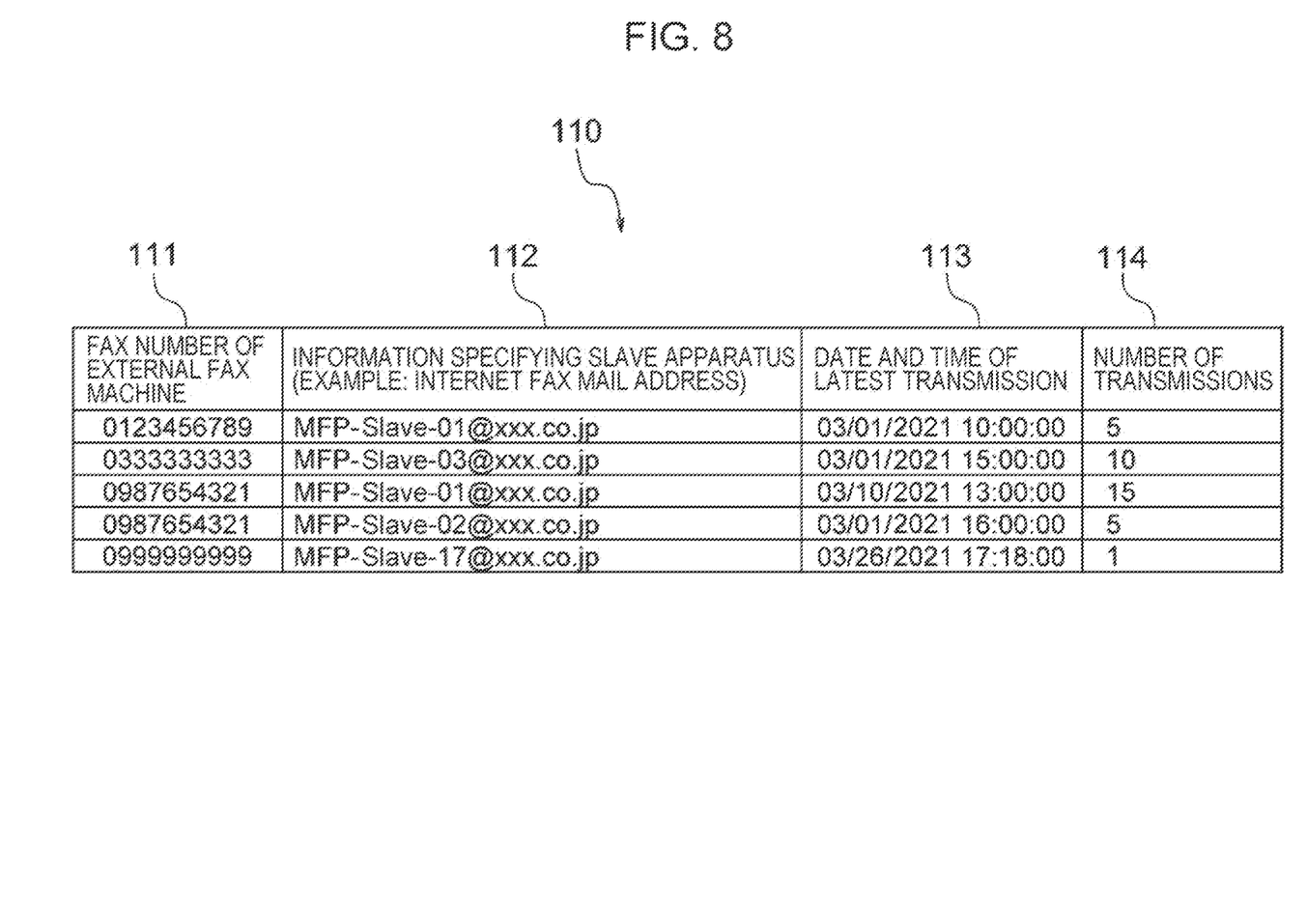
FIG. 8 is a diagram illustrating an example of a correspondence list managed by the MFP master apparatus.

FIG. 8 is a diagram illustrating an example of the correspondence list managed by the MFP master apparatus 10. The correspondence list 110 illustrated in FIG. 5 does not include a record of a FAX number "0999999999" of an external FAX machine. Thus, the CPU 11 registers "0999999999" in the column 111, "MFP-Slave-17@xxx.co.jp" in the column 112, "03/26/2021 17:18:00" in the column 113, and "1" in the column 114, as illustrated in FIG. 8.

Making a request for transmitting a facsimile to an external FAX machine by a slave apparatus and updating the correspondence list by the CPU 11 eliminates the necessity of an initial setting of the correspondence list. In addition, even if an external FAX machine is newly added as a destination, facsimile transmission may be performed from a slave apparatus to the new external FAX machine, and accordingly facsimile reception from the new external FAX machine becomes possible by using an appropriate slave apparatus without manually setting the correspondence list.

After step S114, the CPU 11 executes post-processing for facsimile transmission in step S115. The post-processing for facsimile transmission includes, for example, deletion of original image data of the facsimile.

On the other hand, as a result of the determination in step S113, if the correspondence between information specifying the slave apparatus as the source and the FAX number of the destination is registered in the correspondence list (YES in step S113), the CPU 11 skips step S114 and executes post-processing for facsimile transmission in step S115.

As a result of the determination in step S112, if facsimile transmission has not normally been completed (NO in step S112), the CPU 11 executes error processing of facsimile transmission in step S116. The error processing of facsimile transmission includes, for example, processing of transmitting an email including an error message to the slave apparatus that has requested the transmission.

At the time of registering a record in the correspondence list, the CPU 11 may register, only in a case where a transmission request has been received from a specific requester, a correspondence between identification information identifying the requester and a FAX number of an external FAX machine in the correspondence list. In this case, the specific requester may be a requester having an email address of a predetermined domain as identification information. For example, the CPU 11 may register the correspondence in the correspondence list in the case of a request from an email address having a domain of a company, and may not register the correspondence in the correspondence list in the case of a request from an email address having a domain that is not a domain of a company. In this case, the specific requester may be a requester that has transmitted a facsimile transmission request from a predetermined network. For example, in a case where a facsimile transmission request has been received from an in-house network, the CPU 11 may register the correspondence between identification information identifying the requester and a FAX number of an external FAX machine in the correspondence list.

During a predetermined period, even in a case where the correspondence between identification information identifying a requester and a FAX number of an external FAX machine is not registered in the correspondence list, the CPU 11 may not register the correspondence between the identification information and the FAX number in the correspondence list. Information on the predetermined period may be set in advance by a manager who manages the MFP master apparatus 10. In this case, only in a case where a transmission request has been received from a specific requester, the CPU 11 may register the correspondence between the identification information and the FAX number in the correspondence list even within the predetermined period.

The correspondence list may be held by the MFP slave apparatuses 20A and 20B instead of the MFP master apparatus 10. In a case where the MFP slave apparatuses 20A and 20B each hold a correspondence list, the MFP master apparatus 10 refers to the correspondence list held by the MFP slave apparatus 20A or 20B at the time of transferring a facsimile.

Figure 9:
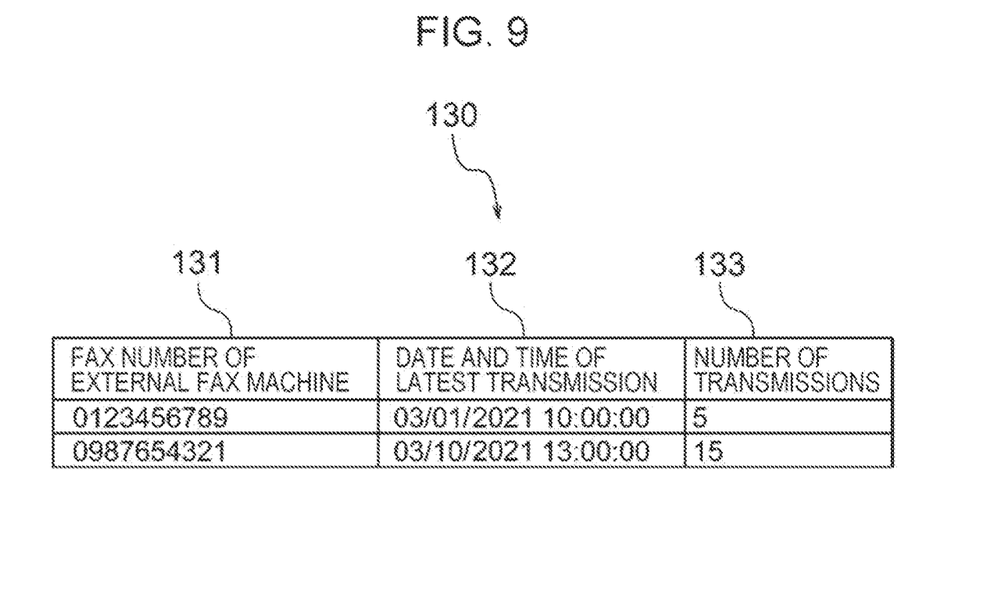
FIG. 9 is a diagram illustrating an example of a correspondence list managed by an MFP slave apparatus.

FIG. 9 illustrates an example of a correspondence list held by the MFP slave apparatus 20A. A correspondence list 130 illustrated in FIG. 9 is made up of a column 131 of a FAX number of an external FAX machine, a column 132 of a date and time of latest transmission, and a column 133 of the number of transmissions. The column 131 stores a FAX number of an external FAX machine. The column 132 stores the date and time when the MFP slave apparatus 20A last transmitted a facsimile to the corresponding FAX number. The column 133 stores the number of times the MFP slave apparatus 20A transmitted a facsimile to the corresponding FAX number.

Figure 10:
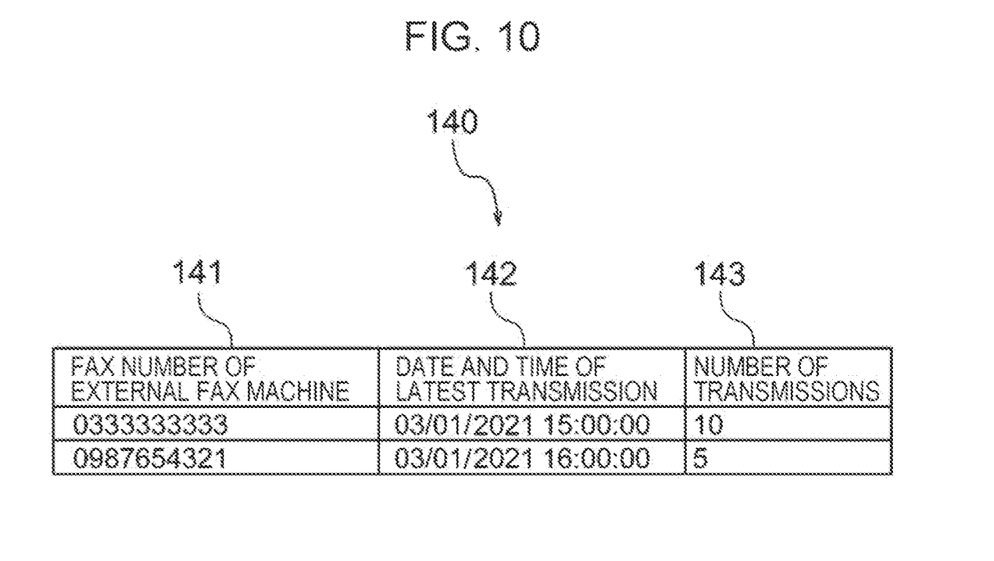
FIG. 10 is a diagram illustrating an example of a correspondence list managed by an MFP slave apparatus.

FIG. 10 illustrates an example of a correspondence list held by the MFP slave apparatus 20B. A correspondence list 140 illustrated in FIG. 10 is made up of a column 141 of a FAX number of an external FAX machine, a column 142 of a date and time of latest transmission, and a column 143 of the number of transmissions. The column 141 stores a FAX number of an external FAX machine. The column 142 stores the date and time when the MFP slave apparatus 20B last transmitted a facsimile to the corresponding FAX number. The column 143 stores the number of times the MFP slave apparatus 20B transmitted a facsimile to the corresponding FAX number.

The MFP master apparatus 10 is capable of determining a transfer destination of a received facsimile by referring to the correspondence lists 130 and 140 illustrated in FIGS. 9 and 10.

In a case where there are plural MFP master apparatuses 10 each having a master-slave relationship with an MFP slave apparatus and in a case where necessity of changing the master-slave relationship arises to adjust the number of MFPs, the correspondence list needs to be corrected if the correspondence list is held by the MFP master apparatus 10. However, when the MFP slave apparatuses each hold information on the fax number of a corresponding external FAX machine, it is possible to change the mater-slave relationship without correcting the correspondence list of the MFP master apparatus 10.

If the MFP master apparatus 10 continuously receives facsimile transmission requests from slave apparatuses, the number of correspondences recorded in the correspondence list increases. Thus, the CPU 11 may delete, from the correspondence list, a record of identification information (for example, an email address) associated with the latest transmission to a FAX number of an external FAX machine performed a predetermined period or more ago. In this case, the CPU 11 may delete, from the correspondence list, a record of identification information associated with the latest transmission performed the predetermined period or more ago and having a predetermined number or less of transmissions to the FAX number.

The information processing system according to the exemplary embodiment is capable of including not only MFPs but also the PC 30 as illustrated in FIG. 1. That is, as long as there is a single MFP master apparatus 10, it is possible to perform facsimile transmission to and facsimile reception from individual apparatuses by using a configuration including plural PCs 30 or MFP slave apparatuses 20 that do not have a facsimile function. Furthermore, even in a case where there is not a facsimile machine near a user because of remote working, working from home, or the like, the user is able to transmit and receive a facsimile by using the MFP master apparatus 10 according to the exemplary embodiment as appropriate from a slave apparatus via the IP network 40.

The information processing executed by reading software (program) by the CPU in the embodiments above may be executed by various processors other than the CPU. The processors in this case may be, for example, a programmable logic device (PLD) whose circuit configuration is changeable after manufacturing, such as a field-programmable gate array (FPGA), a dedicated electric circuit which is a processor having a circuit configuration designed exclusively for executing specific processing, such as an application specific integrated circuit (ASIC), and the like. The information processing may be executed by one of these various processors or may be executed by a combination of two or more processors of the same type or different types (for example, a combination of plural FPGAs, a combination of a CPU and an FPGA, or the like). The hardware structure of these various processors is, more specifically, an electric circuit obtained by combining circuit elements, such as semiconductor elements.

In the embodiments above, a configuration in which the program of information processing is stored (installed) in advance in a ROM or storage has been described, but the configuration is not limited thereto. The program may be provided in the form of being recorded on a non-transitory recording medium, such as a compact disc read-only memory (CD-ROM), a digital versatile disc read-only memory (DVD-ROM), or a universal serial bus (USB) memory. Alternatively, the program may be downloaded from an external apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
transfer data of a received facsimile by referring to correspondence information in which a correspondence between a telephone number and identification information is registered, the identification information identifying a partner of communication by facsimile from or to the telephone number; and
in a case where a facsimile transmission request has been received from a requester and a correspondence between identification information identifying the requester and a telephone number of a destination included in the facsimile transmission request is not registered in the correspondence information, additionally register the correspondence between the identification information and the telephone number in the correspondence information.

2. The information processing apparatus according to claim 1, wherein the processor is configured to register the correspondence between the identification information and the telephone number in the correspondence information only in a case where the facsimile transmission request has been received from a specific requester.

3. The information processing apparatus according to claim 2, wherein the specific requester is a requester having an email address of a predetermined domain as the identification information.

4. The information processing apparatus according to claim 2, wherein the specific requester is a requester that has transmitted the facsimile transmission request from a predetermined network.

5. The information processing apparatus according to claim 1, wherein the processor is configured not to, during a predetermined period, even in a case where the correspondence between the identification information identifying the requester and the telephone number is not registered in the correspondence information, register the correspondence between the identification information and the telephone number in the correspondence information.

6. The information processing apparatus according to claim 5, wherein the processor is configured to register the correspondence between the identification information and the telephone number in the correspondence information only in a case where the facsimile transmission request has been received from a specific requester.

7. The information processing apparatus according to claim 1, wherein the processor is configured to, in a case where there are a plurality of pieces of identification information associated with a telephone number of a source of the facsimile, transfer the data to a transfer destination identified by a highest-priority piece of identification information among the plurality of pieces of identification information.

8. The information processing apparatus according to claim 7, wherein the processor is configured to transfer the data to a transfer destination identified by a piece of identification information having a largest number of transmissions to the telephone number among the plurality of pieces of identification information.

9. The information processing apparatus according to claim 1, wherein the processor is configured to delete, from the correspondence information, the identification information associated with latest transmission to the telephone number performed a predetermined period or more ago.

10. The information processing apparatus according to claim 9, wherein the processor is configured to delete, from the correspondence information, the identification information having a predetermined number or less of transmissions to the telephone number.

11. A non-transitory computer readable medium storing a program causing a computer to execute a process, the process comprising:
transferring data of a received facsimile by referring to correspondence information in which a correspondence between a telephone number and identification information is registered, the identification information identifying a partner of communication by facsimile from or to the telephone number; and
in a case where a facsimile transmission request has been received from a requester and a correspondence between identification information identifying the requester and a telephone number of a destination included in the facsimile transmission request is not registered in the correspondence information, additionally registering the correspondence between the identification information and the telephone number in the correspondence information.

12. An information processing method comprising:
transferring data of a received facsimile by referring to correspondence information in which a correspondence between a telephone number and identification information is registered, the identification information identifying a partner of communication by facsimile from or to the telephone number; and in a case where a facsimile transmission request has been received from a requester and a correspondence between identification information identifying the requester and a telephone number of a destination included in the facsimile transmission request is not registered in the correspondence information, additionally registering the correspondence between the identification information and the telephone number in the correspondence information.

\* \* \* \* \*